United States Patent
Pasternack et al.

(10) Patent No.: US 8,928,312 B2
(45) Date of Patent: Jan. 6, 2015

(54) METHOD, DEVICE AND SYSTEM FOR MONITORING THE DETERMINATION OF A ROTOR ANGLE OF A ROTATING SHAFT BY MEANS OF A RESOLVER

(75) Inventors: Axel Pasternack, Salzgitter (DE); Karl-Dieter Tieste, Wolfenbuettel (DE); Henning Duerkop, Braunschweig (DE)

(73) Assignee: Lenze Automation GmbH, Aerzen (DE)

(*) Notice: Subject to any disclaimer, the term of this patent is extended or adjusted under 35 U.S.C. 154(b) by 233 days.

(21) Appl. No.: 13/511,063

(22) PCT Filed: Nov. 18, 2010

(86) PCT No.: PCT/EP2010/067779
§ 371 (c)(1),
(2), (4) Date: Jul. 26, 2012

(87) PCT Pub. No.: WO2011/061269
PCT Pub. Date: May 26, 2011

(65) Prior Publication Data
US 2012/0313629 A1 Dec. 13, 2012

(30) Foreign Application Priority Data
Nov. 20, 2009 (DE) .......... 10 2009 046 925

(51) Int. Cl.
*G01B 7/30* (2006.01)
*G01D 5/244* (2006.01)

(52) U.S. Cl.
CPC ................. *G01D 5/24461* (2013.01)
USPC .................................... 324/207.25

(58) Field of Classification Search
CPC ....... G01D 5/2046; G01R 31/343; G01B 7/30
USPC ...................................................... 324/207.25
See application file for complete search history.

(56) References Cited

U.S. PATENT DOCUMENTS

| 4,970,450 A | 11/1990 | Karl et al. |
| 7,723,940 B2 | 5/2010 | Tinebor |
| 2011/0187358 A1 | 8/2011 | Eutebach |

FOREIGN PATENT DOCUMENTS

| DE | 38 34 384 A1 | 4/1990 |
| DE | 10 2008 024 527 A1 | 11/2009 |
| EP | 2 078 933 A2 | 7/2009 |
| JP | 2007163287 A | 6/2007 |
| WO | WO 2004/070924 A2 | 8/2004 |

OTHER PUBLICATIONS

German Office Action dated Jul. 5, 2012 including English-language translation (Fourteen (14) pages), 102009046925.7.
International Preliminary Report on Patentability dated Jun. 21, 2012 (Ten (10) pages), PCT/EP2010/067779.
International Search Report dated Feb. 10, 2011 with English translation (four (4) pages), PCT/EP2010/067779.

*Primary Examiner* — Reena Aurora
(74) *Attorney, Agent, or Firm* — Crowell & Moring LLP

(57) ABSTRACT

In a method for monitoring the determination of a rotor angle of a rotating shaft by use of a resolver monitoring the determination of the rotor angle is carried out by: a first test AC voltage at a test frequency which is not the same as an exciter frequency of the resolver is applied to a first stator winding of the resolver, and a second test AC voltage at the test frequency is applied to at least one second stator winding of the resolver, wherein the first and the second test AC voltages are produced such that an AC voltage is induced all the time in at least one rotor winding of the resolver as a result of the first and the second test AC voltages.

21 Claims, 1 Drawing Sheet

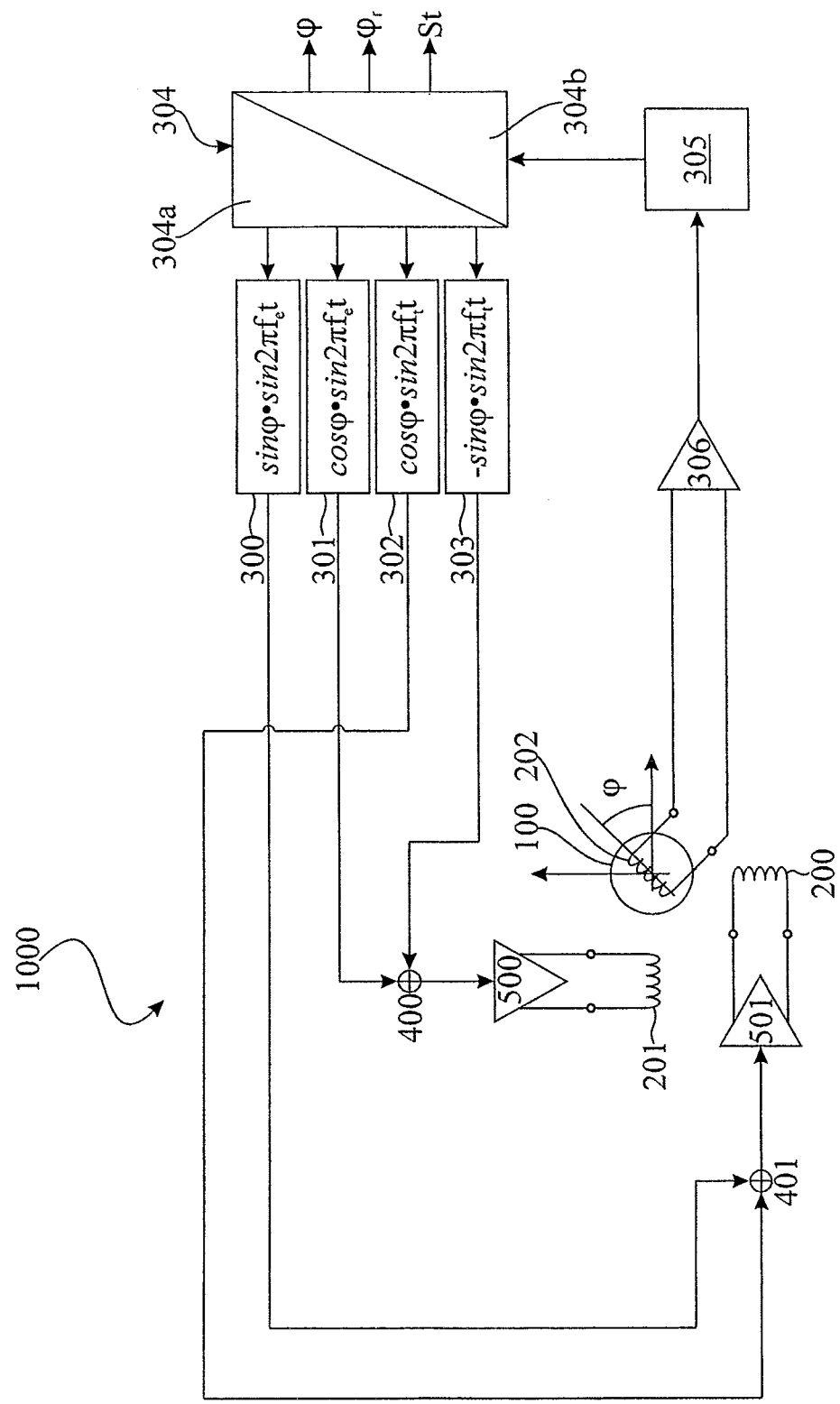

_US 8,928,312 B2_

METHOD, DEVICE AND SYSTEM FOR MONITORING THE DETERMINATION OF A ROTOR ANGLE OF A ROTATING SHAFT BY MEANS OF A RESOLVER

BACKGROUND AND SUMMARY OF THE INVENTION

The invention relates to a method and a device for monitoring the determination of a rotor angle of a rotating shaft by use of a resolver, and to a system.

In the case of machines which are moved by use of electrical drives, a so-called resolver is frequently used to determine machine movements, in that the resolver detects a rotor angle or a rotor angle change of a rotating shaft which is coupled to an electric motor, by which it is possible to determine a position of a machine element which is moved by use of the electrical drive and the shaft.

Resolvers are low-cost, magnetically operated transmitters. They use the angle-dependent coupling between at least one rotor winding and at least two stator windings. A resolver typically includes a first stator winding, a second stator winding whose winding axis is at right angles to the winding axis of the first stator winding, and a rotor winding which is connected to the rotating shaft such that they rotate together. The two stator windings are normally arranged fixed in a housing of a transmitter. The resolvers produce the rotor angle directly within a doubled pole pitch. The rotation speed can be determined from the angle change. In addition, reference is also made to the relevant specialist literature.

In safety-critical applications, a diagnostic capability is required for the transmitter system that is used. In order to allow a low-cost resolver to be used as a transmitter for safety-critical applications, it is therefore necessary for a plausibility check and monitoring of the resolver function to be carried out in addition to determination of the rotor angle by use of the resolver in order, for example, to allow malfunctions and defects in the resolver to be identified, and to cause the electrical drive to be switched off in this situation.

The invention is based on the object of providing a method and a device for monitoring the determination of a rotor angle of a rotating shaft by use of the resolver, as well as a system, which will allow reliable monitoring, which can be implemented at low cost, and which in particular can easily be integrated in conventional systems for angle determination using a resolver.

The invention achieves this object by a method, device and system for monitoring the determination of a rotor angle of a rotating shaft via a resolver, wherein the resolver comprises: a first stator winding; at least one second stator winding, whose winding axis is rotated through a predetermined angle with respect to the winding axis of the first stator winding, and at least one rotor winding, which is connected to the rotating shaft such that they rotate together, wherein for determination of the rotor angle: a first exciter AC voltage at an exciter frequency and with a first amplitude is applied to the first stator winding; a second exciter AC voltage at the exciter frequency and with a second amplitude is applied to the at least one second stator winding; and the first amplitude and the second amplitude are produced via a regulator such that no voltage is induced in the at least one rotor winding as a result of the first and the second exciter AC voltages in a stationary state, wherein a manipulated variable of the regulator maps the rotor angle, wherein the method for monitoring the determination of the rotor angle comprises the steps of: applying a first test AC voltage at a test frequency which is not the same as the exciter frequency to the first stator winding, and applying a second test AC voltage at the test frequency to the at least one second stator winding, wherein the first and the second test AC voltages are produced such that an AC voltage is induced all the time in the at least one rotor winding as a result of the first and the second test AC voltages.

In the method for monitoring the determination of a rotor angle of a rotating shaft by use of a resolver, the resolver includes a first stator winding, at least one second stator winding, whose winding axis is rotated through a predetermined angle, in particular through 90°, with respect to the winding axis of the first stator winding, and at least one rotor winding, which is connected to the rotating shaft such that they rotate together. The following steps are carried out for determination of the rotor angle: a first, in particular sinusoidal, exciter AC voltage at an exciter frequency and with a first rotor-angle-dependent amplitude is applied to the first stator winding, a second, in particular sinusoidal, exciter AC voltage at the exciter frequency and with a second rotor-angle-dependent amplitude is applied to the at least one second stator winding, and the first amplitude and the second amplitude are produced by way of a regulator such that no voltage is induced in the at least one rotor winding as a result of the first and the second exciter AC voltages in a stationary state, wherein a manipulated variable of the regulator maps the rotor angle. The magnetic alternating field which is produced as a result of the exciter signals is at right angles to an axis of the rotor winding in the stationary state. A method such as this is described in laid-open specification DE 38 34 384 A1, which to this extent is included by reference in the subject matter of the description, in order to avoid unnecessary repetitions. The following steps are carried out for monitoring the determination of the rotor angle: a first, in particular sinusoidal, test AC voltage at a test frequency which is not the same as the exciter frequency is applied to the first stator winding, and a second, in particular sinusoidal, test AC voltage at the test frequency is applied to the at least one second stator winding, wherein the first and the second test AC voltages and their amplitudes are produced as a function of the rotor angle, that is to say as a function of the manipulated variable of the regulator which maps the rotor angle, such that an AC voltage is induced all the time in the at least one rotor winding as a result of the first and the second test AC voltages. It is self-evident that the exciter AC voltages and/or the test AC voltages can also be replaced by corresponding exciter alternating currents and test alternating currents, respectively. The AC voltage which is induced in the at least one rotor winding as a result of the first and the second test AC voltages can be used for plausibility checking/monitoring of the resolver function.

In one development, the first and the second test AC voltages, in particular their amplitudes, are produced as a function of the rotor angle such that a magnetic alternating field which is produced as a result of the first and the second test AC voltages runs essentially parallel to the winding axis of the rotor winding.

In one development, the test frequency can be represented as $ft=k*fe$, where ft denotes the test frequency, fe denotes the exciter frequency and k is a rational number greater than zero. Preferably, $k=2$, that is to say the test frequency is twice as great as the exciter frequency.

In one development, only those signal components which are induced in the rotor winding and are produced by the first and the second exciter AC voltages are used for determination of the rotor angle, that is to say the contributions of the test AC voltages are suppressed for rotor angle determination.

In one development, signal components which are induced in the rotor winding as a result of the first and the second test AC voltages are evaluated in order to determine a line break, a short circuit and/or a mechanical defect in the resolver, and/or are evaluated for redundant determination of the rotor angle.

In one development, a voltage which is induced in the at least one rotor winding as a result of the exciter AC voltages and the test AC voltages is separated via correlation into signal components which are induced in the rotor winding as a result of the test AC voltages and into signal components which are induced in the rotor winding as a result of the exciter AC voltages. This allows an evaluation to be carried out separately on the basis of signal components, that is to say the rotor angle can be determined in the conventional manner on the basis of only those signal components which are induced in the rotor winding exclusively as a result of the exciter AC voltages, without any need for complex filters for this purpose, in order to suppress those signal components, which to this extent are disturbing and are caused by the test AC voltages.

The device for monitoring the determination of a rotor angle of a rotating shaft is designed to carry out the method mentioned above and includes: a module for application of a first, in particular sinusoidal, exciter AC voltage at an exciter frequency and with a first rotor-angle-dependent amplitude to the first stator winding, a module for application of a second, in particular sinusoidal, exciter AC voltage at the exciter frequency and with a second rotor-angle-dependent amplitude to the at least one second stator winding, and a module for production of the first amplitude and of the second amplitude by way of a regulator such that no voltage is induced in the at least one rotor winding as a result of the first and the second exciter AC voltages in a stationary state, wherein a manipulated variable of the regulator maps the rotor angle. The following are also provided: a module for application of a first, in particular sinusoidal, test AC voltage at a test frequency which is not the same as the exciter frequency, to the first stator winding, a module for application of a second, in particular sinusoidal, test AC voltage at the test frequency to the at least one second stator winding, wherein the first and the second test AC voltages and their amplitudes are produced as a function of the rotor angle such that an AC voltage is induced all the time in the at least one rotor winding as a result of the first and the second test AC voltages, and also a module for evaluation of signal components which are induced in the rotor winding as a result of the first and the second test AC voltages, in order to determine a line break, a short circuit and/or a mechanical defect in the resolver, and/or for redundant determination of the rotor angle.

The system includes a resolver and a resolver monitoring device as mentioned above.

BRIEF DESCRIPTION OF THE DRAWING

The invention will be described in the following text with reference to the attached drawing which illustrates preferred embodiments of the invention. In this case, illustrated schematically:

FIG. 1 schematically illustrates a system according to an embodiment of the invention for monitoring the determination of a rotor angle of a rotating shaft by use of a resolver.

DETAILED DESCRIPTION OF THE DRAWING

FIG. 1 shows a system 1000 according to an embodiment of the invention with a resolver and a device for monitoring the correct operation of the resolver.

The resolver has a first stator winding 200, a second stator winding 201 whose winding axis is rotated through 90° with respect to the winding axis of the first stator winding, and a rotor winding 202, which is connected to a rotating shaft 100 such that they rotate together. A rotor angle to be determined is annotated $\phi$.

The system or the resolver includes module 300, for example in the form of a D/A converter followed by an amplifier, for application of a first sinusoidal exciter AC voltage Ue1=sin $\phi$ sin $2\pi$fet at an exciter frequency fe of 4 kHz and with a first rotor-angle-dependent amplitude sin $\phi$ to the first stator winding 200, module 301, for example in the form of a D/A converter followed by an amplifier, for application of a second sinusoidal exciter AC voltage Ue2=cos $\phi$·sin $2\pi$fet at the exciter frequency fe and with a second rotor-angle-dependent amplitude cos $\phi$, to the second stator winding 201, and module 304a for production of the first amplitude and of the second amplitude by use of a regulator which is integrated in the module 304a such that no voltage is induced in the rotor winding 202 as a result of the first and the second exciter AC voltages Ue1 and Ue2 in a stationary or steady state, wherein a manipulated variable of the regulator maps the rotor angle. The module 304a and the regulator are implemented in the form of a microprocessor or a signal processor 304 and associated software. In addition, reference is also made to DE 38 34 384 A1.

The monitoring device includes module 302, for example in the form of a D/A converter followed by an amplifier, for application of a first sinusoidal test AC voltage Ut1=cos $\phi$·sin $2\pi$ftt at a test frequency ft of 8 kHz to the first stator winding 200, module 303, for example in the form of a D/A converter followed by an amplifier, for application of a second sinusoidal test AC voltage Ut2=−sin $\phi$·sin $2\pi$ftt at the test frequency ft to the second stator winding 201, wherein the first and the second test AC voltages Ut1 and Ut2 are produced as a function of the rotor angle, that is to say as a function of the rotor angle currently being determined by use of the resolver, such that an AC voltage is induced all the time in the rotor winding 202.

The signals and voltages which are produced by the modules 300 and 302 are added or superimposed in an adder 401, are then amplified by means of an amplifier 501, and are applied to the first stator winding 200. The signals and voltages produced by the modules 301 and 303 are correspondingly added or superimposed in an adder 400, are then amplified by use of an amplifier 500, and are applied to the second stator winding 201.

In the illustrated embodiments, the separate analog production of exciter AC voltages and test AC voltages as well as their addition by use of separate D/A converters and analog adders are described. It is self-evident that the addition of exciter AC voltages and test AC voltages can also already be carried out in the digital signal production.

The AC voltage induced in the rotor winding 202 is first of all amplified by an amplifier 306, is digitized by an A/D converter 305, and is evaluated in the microprocessor or signal processor 304. For this purpose, the AC voltage which is induced in the rotor winding 202, is amplified and is then digitized, is first of all separated by way of correlation into those signal components which are induced in the rotor winding 202 as a result of the exciter AC voltages and separated into those signal components which are induced in the rotor winding 202 as a result of the test AC voltages.

In order to determine the amplitudes and mathematical signs of these signal components separately from one another, the rotor winding voltage is sampled at a frequency of 64 kHz. This therefore results in 16 sample values V(n), n=0 . . . 15 for one 4 kHz period.

The following correlation is carried out for determination of the amplitude:

$$A = \text{sum}\_n = 0 \ldots 15(V(n)*D\_x(n)).$$

In order to determine those signal components which are produced by the exciter AC voltages Ue1 and Ue2, a demodulation is carried out for the exciter frequency at 4 kHz. D__4(n, n=0 . . . 15) becomes D__4(n)=sin (360°/16*n). The signal components calculated in this way are used as an input signal for the module 304a and the regulator, which results in no voltage being induced in the rotor winding 202 as a result of the first and the second exciter AC voltages Ue1 and Ue2 in a stationary or steady state. The manipulated variable of the regulator maps the rotor angle φ, as already stated above, and is output as a variable φ at an associated output of the microprocessor 304.

In order to calculate those signal components which are produced by the test AC voltages Ut1 and Ut2, a demodulation is carried out for the test frequency with 8 kHz D__8(n)=sin (360°/16*2n). The signal components calculated in this way are used as an input signal for the evaluation module 304b which evaluate this signal component for determination of a line break, a short circuit and/or a mechanical defect in the resolver, and/or for redundant determination of the rotor angle φ. The evaluation module 304b and/or the microprocessor 304 produce/produces the redundantly determined rotor angle as the variable φr at associated outputs, as well as a status signal St, which codes a line break, a short circuit or a mechanical defect of the resolver.

In order to detect a defect in the resolver, the evaluation module 304b checks whether those signal components in the rotor winding 202 which are produced by the test AC voltages Ut1 and Ut2 differ from those in the normal state. If this is the case, the defect in the resolver can be deduced.

By way of example, a phase shift between the test AC voltages and those signal components in the rotor winding which are produced by the test AC voltages Ut1 and Ut2 can be evaluated for redundant determination of the rotor angle.

In the illustrated embodiments, the resolver has two stator windings and one rotor winding. It is self-evident that the invention can also be used for resolvers which, for example have three or more stator windings and/or two or more rotor windings. The exciter frequencies and test frequencies may, of course, also have values other than those mentioned.

It is also furthermore self-evident that the arrangement of the stator winding and rotor winding can be interchanged, that is to say a (test) signal feed can be provided in the rotor and a voltage induced in the stator is tapped off and measured.

The illustrated embodiments allow reliable resolver monitoring, which can be implemented at low cost, and can easily be integrated in conventional systems for angle determination using a resolver.

The invention claimed is:

1. A method for monitoring the determination of a rotor angle of a rotating shaft via a resolver, wherein the resolver comprises:
    a first stator winding;
    at least one second stator winding, whose winding axis is rotated through a predetermined angle with respect to the winding axis of the first stator winding, and
    at least one rotor winding, which is connected to the rotating shaft such that they rotate together,
    wherein for determination of the rotor angle:
    a first exciter AC voltage at an exciter frequency and with a first amplitude is applied to the first stator winding;
    a second exciter AC voltage at the exciter frequency and with a second amplitude is applied to the at least one second stator winding; and
    the first amplitude and the second amplitude are produced via a regulator such that no voltage is induced in the at least one rotor winding as a result of the first and the second exciter AC voltages in a stationary state, wherein a manipulated variable of the regulator maps the rotor angle,
    wherein the method for monitoring the determination of the rotor angle comprises the steps of:
    applying a first test AC voltage at a test frequency which is not the same as the exciter frequency to the first stator winding, and
    applying a second test AC voltage at the test frequency to the at least one second stator winding, wherein the first and the second test AC voltages are produced such that an AC voltage is induced all the time in the at least one rotor winding as a result of the first and the second test AC voltages.

2. The method according to claim 1, wherein the first and second exciter AC voltages and the first and second test AC voltages are sinusoidal.

3. The method according to claim 2, wherein the first and the second test AC voltages are produced as a function of the rotor angle such that a magnetic alternating field, produced as a result of the first and the second test AC voltages, runs essentially parallel to the winding axis of the rotor winding.

4. The method according to claim 1, wherein the first and the second test AC voltages are produced as a function of the rotor angle such that a magnetic alternating field, produced as a result of the first and the second test AC voltages, runs essentially parallel to the winding axis of the rotor winding.

5. The method according to claim 4, wherein the test frequency can be represented as ft=k*fe, where ft denotes the test frequency, denotes the exciter frequency and k is a rational number greater than zero.

6. The method according to claim 4, wherein only those signal components which are induced in the rotor winding and are produced by the first and the second exciter AC voltages are used for determination of the rotor angle.

7. The method according to claim 4, wherein signal components which are induced in the rotor winding as a result of the first and the second test AC voltages are evaluated in order to determine at least one of a line break, a short circuit, and a mechanical defect in the resolver.

8. The method according to claim 4, wherein signal components which are induced in the rotor winding as a result of the first and the second test AC voltages are evaluated for redundant determination of the rotor angle.

9. The method according to claim 1, wherein the test frequency can be represented as ft=k*fe, where ft denotes the test frequency, denotes the exciter frequency and k is a rational number greater than zero.

10. The method according to claim 9, wherein only those signal components which are induced in the rotor winding and are produced by the first and the second exciter AC voltages are used for determination of the rotor angle.

11. The method according to claim 9, wherein signal components which are induced in the rotor winding as a result of the first and the second test AC voltages are evaluated in order to determine at least one of a line break, a short circuit, and a mechanical defect in the resolver.

12. The method according to claim 9, wherein signal components which are induced in the rotor winding as a result of the first and the second test AC voltages are evaluated for redundant determination of the rotor angle.

13. The method according to claim 1, wherein only those signal components which are induced in the rotor winding and are produced by the first and the second exciter AC voltages are used for determination of the rotor angle.

14. The method according to claim 13, wherein signal components which are induced in the rotor winding as a result of the first and the second test AC voltages are evaluated in order to determine at least one of a line break, a short circuit, and a mechanical defect in the resolver.

15. The method according to claim 13, wherein signal components which are induced in the rotor winding as a result of the first and the second test AC voltages are evaluated for redundant determination of the rotor angle.

16. The method according to claim 1, wherein signal components which are induced in the rotor winding as a result of the first and the second test AC voltages are evaluated in order to determine at least one of a line break, a short circuit, and a mechanical defect in the resolver.

17. The method according to claim 1, wherein signal components which are induced in the rotor winding as a result of the first and the second test AC voltages are evaluated for redundant determination of the rotor angle.

18. The method according to claim 1, wherein a voltage which is induced in the at least one rotor winding as a result of the first and the second exciter AC voltages and the first and the second test AC voltages is separated by use of correlation into signal components which are induced in the rotor winding as a result of the first and the second test AC voltages, and into signal components which are induced in the rotor winding as a result of the first and the second exciter AC voltages.

19. A device for monitoring the determination of a rotor angle of a rotating shaft by use of a resolver,
    wherein the resolver comprises:
        a first stator winding,
        at least one second stator winding, whose winding axis is rotated through a predetermined angle with respect to the winding axis of the first stator winding, and
        at least one rotor winding, which is connected to the rotating shaft such that they rotate together,
    a first module for application of a first exciter AC voltage at an exciter frequency and with a first amplitude to the first stator winding,
    a second module for application of a second exciter AC voltage at the exciter frequency and with a second amplitude to the at least one second stator winding, and
    a third module for production of the first amplitude and of the second amplitude by way of a regulator such that no voltage is induced in the at least one rotor winding as a result of the first and the second exciter AC voltages in a stationary state, wherein a manipulated variable of the regulator maps the rotor angle, wherein the device comprises:
        a first module for application of a first test AC voltage at a test frequency which is not the same as the exciter frequency, to the first stator winding,
        a second module for application of a second test AC voltage at the test frequency to the at least one second stator winding, wherein the first and the second test AC voltages are produced such that an AC voltage is induced all the time in the at least one rotor winding as a result of the first and the second test AC voltages, and
        a third module for evaluation of signal components which are induced in the rotor winding as a result of the first and the second test AC voltages, in order to determine at least one of a line break, a short circuit, a mechanical defect in the resolver, and for redundant determination of the rotor angle.

20. The device according to claim 19, wherein the first and second exciter AC voltages and the first and second test AC voltages are sinusoidal.

21. A system, comprising:
    a resolver, comprising:
        at least one first stator winding,
        at least one second stator winding, whose winding axis is at a predetermined angle with respect to the winding axis of the at least one first stator winding, and
        at least one rotor winding, which is connected to the rotating shaft such that they rotate together, wherein:
            the resolver is operatively configured to determine the rotor angle by use of rotor excitation or stator excitation;
    a device for monitoring the determination of the rotor angle by use of the resolver,
    the device comprising:
        a first module for application of a first test AC voltage at a test frequency which is not the same as the exciter frequency, to the first stator winding,
        a second module for application of a second test AC voltage at the test frequency to the at least one second stator winding, wherein the first and the second test AC voltages are produced such that an AC voltage is induced all the time in the at least one rotor winding as a result of the first and the second test AC voltages, and
        a third module for evaluation of signal components which are induced in the rotor winding as a result of the first and the second test AC voltages, in order to determine at least one of a line break, a short circuit, a mechanical defect in the resolver, and for redundant determination of the rotor angle.

* * * * *